April 21, 1931.  J. D. PETERSEN  1,801,878
BRAKE INDICATOR
Filed Nov. 2, 1928
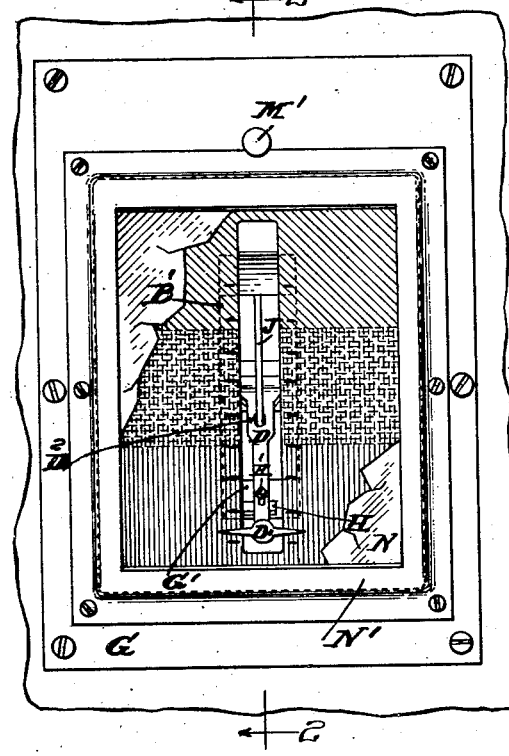
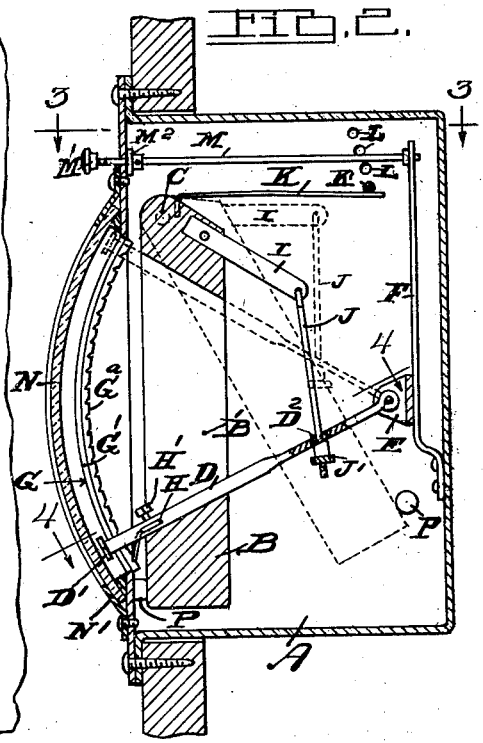
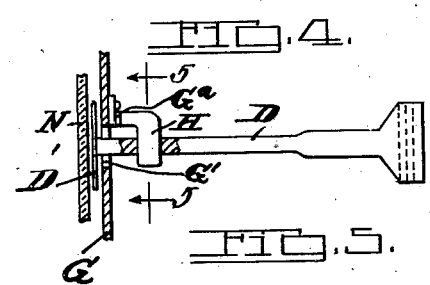
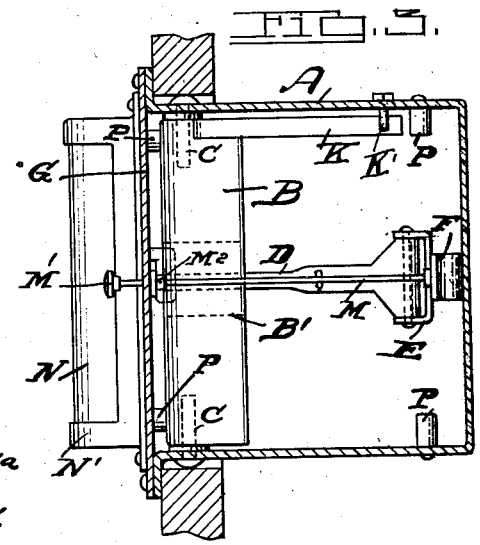
INVENTOR
John D. Petersen
BY
S. E. Thomas
ATTORNEY Patented Apr. 21, 1931

1,801,878

UNITED STATES PATENT OFFICE

JOHN D. PETERSEN, OF DETROIT, MICHIGAN

BRAKE INDICATOR

Application filed November 2, 1928. Serial No. 316,767.

My invention relates to an improvement in brake indicators and while it may be otherwise applied it is especially designed for use upon motor vehicles, whereby the operative condition of the brake mechanism of the vehicle may be accurately determined when applying the brake, the invention being shown in the accompanying drawings and more particularly described and set forth in the following specification and claims.

The primary object of the invention is to provide a simple and inexpensive device indicating the braking force applied upon actuating the brake mechanism, thereby insuring greater safety in the operation of motor driven vehicles.

A further object of the invention is to provide a simple and effective means whereby the condition of the brake mechanism may be readily and quickly determined that suitable adjustment or repairs may be made when required.

A further object of the invention is to provide an indicator which may be installed upon the instrument board of the motor vehicle in view of the driver that he may readily determine at any time the operative condition of the brake mechanism.

A further object of the invention is to provide means whereby the maximum braking force applied while driving will be indicated, the indicator remaining in its adjusted position until manually released.

A further object of the invention is to provide the device with a graduated scale, or a multi-color chart or both, over which the indicator traverses upon actuating the brake so that either the driver of the car, or the proper traffic authorities may readily determine the condition of the brake mechanism.

With the foregoing and other objects in view which will appear as the description proceeds, the invention further resides in the combination and arrangement of parts and in the details of construction hereinafter described and claimed, it being understood that changes may be made in the precise embodiment of the invention shown without departing from the spirit of the same.

In the drawings accompanying this specification:

Figure 1 is a front elevation of the device attached to a fragment of an instrument board, showing the glass window covering the graduated scale broken away.

Figure 2 is a vertical cross-sectional view taken on or about line 2—2 of Figure 1, showing in full lines the oscillatory weight and the cooperating indicator bar in their normal positions, and in dotted lines the indicator bar and weight as they would appear upon making a registration following the operation of the brake mechanism while driving the vehicle.

Figure 3 is a horizontal cross-sectional and plan view taken on or about line 3—3 of Figure 2.

Figure 4 is a plan and horizontal sectional view of the swinging arm, showing a dog adjustably supported in the arm engaging the teeth of a segmental rack-bar, also a fragment of the enclosing case,—taken on or about line 4—4 of Figure 2.

Figure 5 is a fragmentary elevation and sectional view of a detail, taken on or about line 5—5 of Figure 4.

Referring now to the letters of reference placed upon the drawings:

A denotes a housing for the device, and when employed upon an automobile for determinating the condition of its braking mechanism is preferably mounted upon the instrument-board in a convenient position for observation by the driver of the vehicle.

B indicates a normally static oscillatory weight, suspended in a vertical or nearly vertical position from suitable pivotal supports C projecting from the walls of the housing.

The oscillatory weight B is provided with a central elongated vertical slot $B^1$, through which projects a swinging arm D pivoted to a bracket E secured to a yieldable support F, riveted or otherwise attached to the wall of the housing. The free end of the swinging arm D is provided with a pointer $D^1$, overlapping a slot $G^1$ in the segmental wall G, secured to a flange of the casing wall. Secured to the inside of the segmental wall is a rack-bar $G^a$ adjacent the slotted opening.

H denotes an adjustable dog supported in a slot in the swinging arm D, which is adapted to engage the teeth of the segmental rackbar G$^a$. H$^1$ is a set screw carried by the swinging arm to secure the dog when properly adjusted.

I indicates a bracket arm, projecting rearwardly from the oscillatory weight, from the end of which is loosely suspended a rod J, extending through a slot D$^2$ in the swinging arm. J$^1$ is a nut screwed upon the end of the rod to adjustably connect the weight with the swinging arm, that the latter may be raised upon the oscillation of the weight.

K denotes a relatively light spring arm secured at one end to the weight, adapted at its free end to abut against a pin K$^1$ lodged in one of a series of holes L in the wall of the housing to assist in returning the weight to its normal position.

M is a push-rod projecting through the wall of the housing connected at its inner end with the yieldable support F. M$^1$ is a button on the end of the push rod, that it may be conveniently operated. M$^2$ is a stop lug secured to the rod on the inside of the casing to limit the outward movement of the rod by bearing against the wall of the casing.

N denotes an arc-shaped glass window, covering the segmental wall G, secured in position by a suitable frame N$^1$ attached to the wall of the housing. The slotted segmental wall G may be graduated on its outer face that it may cooperate with the pointer D$^1$ carried by the swinging arm D to indicate the operative condition of the brake mechanism. Bands of color,—for example red, yellow and green, arbitrarily shown in Figure 1, may also be displayed to graphically indicate the condition of the brake mechanism shown by the position of the swinging pointer with reference to said colors,—following the operation of the brake.

P, P are bumpers to limit the oscillation of the swinging weight.

Having indicated the several parts by reference letters, the operation of my invention will be readily understood.

As previously indicated, the device is mounted in a motor vehicle so that the weight will oscillate in the direction of the movement of the vehicle.

Normally the weight is static, and hangs vertically due to gravity and the urge of the spring K. When the vehicle is moving, upon operating the brake levers—not shown —sufficiently to retard the movement of the vehicle, the suspended weight will be caused to swing in the direction in which the vehicle is or was travelling. The amount of deflection will be proportional to the amount of effective force applied to the brake mechanism and to the rate of deceleration of the vehicle. The movement of the oscillating weight as indicated in dotted lines in Figure 2, will raise the swinging bar D, due to the connection of the rod J with the arm I, attached to the weight. The indicator D$^1$ on the end of the swinging arm is thus forced to traverse the arc-shaped graduated wall G, and due to the graduations on the plate and the bands of color denoting, Dangerous, Fair, Good, the working condition of the brake mechanism is forcibly and continuously brought to the attention of the driver that he may correct the same if faulty.

As the arm D is carried upwardly by the swinging weight, the dog H engages the teeth of the rack-bar, thereby holding the swinging arm at its highest altitude, indicating the instant condition of the brake mechanism,—the indicator remaining in that position until manually released by pressure upon the push rod M, against the yieldable support F carrying the bracket E, to which the swinging arm D is pivoted. This action it will be apparent serves to withdraw the dog H from engagement with the teeth of the rack-bar that the swinging arm D and the oscillatory weight may return to their initial positions.

Having thus described my invention what I claim is:

1. In a device of the character described, a housing; a normally static, oscillatory weight having an elongated slot, pivotally suspended within the housing; a segmental plate, secured to the housing, having an elongated graduated slot; a segmental rack-bar secured to the inner wall of the plate adjacent the slot in the latter; a swinging arm pivoted within the housing and extending through the slot in the weight and segmental plate; means for operably connecting the oscillatory weight with the swinging arm; a pointer carried by the swinging arm, adapted to coordinate with the graduations on the segmental plate; a dog adjustably mounted upon the swinging arm, adapted to engage the teeth of the rack-bar, whereby upon setting the brake mechanism to check or stop the vehicle, said pointer carried by the swinging arm and actuated by the oscillation of the weight will register the operative condition of the braking mechanism; and means for releasing the dog from engagement with the rack-bar, whereby the pointer may return to its normal zero position.

2. In a device of the character described, a housing; a normally static oscillatory weight suspended within the housing having an elongated slot; a segmental plate secured to the housing having an elongated graduated slot and an inwardly projecting rack-bar adjacent the slot; a yieldable supporting bracket for a swinging arm secured to the wall of the housing; a swinging arm, pivoted to the yieldable bracket at one end extending respectively through the slots in the oscillatory weight and segmental plate with a pointer at its opposite end overlapping the segmental plate; a dog mounted upon the swinging arm adapted to engage the teeth of the rack-bar; means connecting the oscillatory weight and the swinging arm, whereby upon applying the brake mechanism to check or stop the motion of the vehicle, the pointer carried by the swinging arm is caused to traverse the graduated segmental plate, due to the oscillation of the weight resulting from the deceleration of the vehicle; and a push rod connected with the yieldable support extending through the wall of the housing, whereby upon applying pressure to the push rod, the dog carried by the swinging arm may be released from the rack-bar that the oscillatory weight may return to its normally static position.

3. In a device of the character described, a housing, a normally static, oscillatory weight pivotally suspended within the housing, an arc-shaped glass window secured to the housing, a segmental wall secured to the housing behind said window and spaced therefrom and having a slot therein, and graduations on the opposite sides of the slot, a rack-bar disposed against the inner face of said curved wall adjacent said slot, an arm swingingly mounted within the housing and at its outer end projecting through the slot of said wall and carrying a pointer located between the window and said wall for co-action with said graduations, a dog carried by the swinging arm adapted to engage the teeth of the rack-bar, means connecting the oscillatory weight and the swinging arm, whereby upon applying the brake mechanism to check or stop the motion of the vehicle, the pointer carried by the swinging arm is caused to traverse the graduated plate, due to the oscillation of the weight resultant from the deceleration of the vehicle.

4. A device as specified in claim 3 in combination with resilient means adapted to act upon the oscillatory weight to assist in returning the latter to its normal position following its release when elevated.

5. In a device of the character described, a housing, a normally static, oscillatory weight pivotally suspended within the housing and having a slot therein, a slotted graduated plate, a rack-bar mounted on said plate on the inner face thereof adjacent said slot, an arm swingingly mounted in the housing and projecting through the opening in the weight and through the slot in said plate and carrying a pointer adapted to co-act with the graduations on the plate, a dog carried by said swinging arm adapted to engage the teeth of the rack bar, a connection between the weight and the swinging arm, whereby upon applying the brake mechanism to check or stop the motion of the vehicle, the pointer carried by the swinging arm is caused to traverse the graduations on said plate, due to the oscillation of the plate resultant from the deceleration of the vehicle.

6. In a device of the character described, a housing, a normally static, oscillatory plate pivotally suspended within the housing, a graduated plate, a segmental rack-bar, a yieldable support mounted on a wall of the housing and located therein, an arm pivotally mounted on said yieldable support and carrying a pointer adapted to traverse the graduated plate, a dog carried by the swinging arm adapted to engage the teeth of the rack-bar, a connection between the weight and the swinging arm, whereby upon applying the brake mechanism to check or stop the motion of the vehicle, the pointer carried by the swinging arm is caused to traverse the graduated plate, due to the oscillation of the weight resultant from the deceleration of the vehicle, and a push rod connected with the yieldable support to effect a disconnection of said dog from the rack-bar.

In testimony whereof, I sign this specification.

JOHN D. PETERSEN.